United States Patent [19]

Gagelin

[11] 4,451,052
[45] May 29, 1984

[54] INTEGRAL CYLINDER LIFT MECHANISM

[75] Inventor: Martin J. Gagelin, Wahpeton, N. Dak.

[73] Assignee: Lear Siegler, Inc., Santa Monica, Calif.

[21] Appl. No.: 318,385

[22] Filed: Nov. 5, 1981

[51] Int. Cl.³ .............................................. A01B 63/22
[52] U.S. Cl. ................................. 280/43.23; 172/413
[58] Field of Search ................... 280/43.23, 43.2, 656; 172/413, 448, 443, 240

[56] References Cited

U.S. PATENT DOCUMENTS

| 1,844,124 | 2/1932 | Jordan . | |
|---|---|---|---|
| 2,641,886 | 6/1953 | Graham | 280/43.23 |
| 2,655,851 | 10/1953 | Pursche | 97/26 |
| 3,090,446 | 5/1963 | Hausmann | 172/4 |
| 3,172,218 | 3/1965 | Constantin | 37/153 |
| 3,648,780 | 3/1972 | Fuselein et al. | 172/319 |
| 3,700,043 | 10/1972 | Sullivan | 172/400 |
| 4,063,745 | 12/1977 | Olson | 280/43.23 |
| 4,077,477 | 3/1978 | van der Lely et al. | 172/114 |
| 4,106,568 | 8/1978 | Cline | 172/327 |
| 4,117,893 | 10/1978 | Kinzenbaw | 172/311 |
| 4,194,573 | 3/1980 | Rettkowski | 172/400 |
| 4,266,898 | 5/1981 | Jacobsen et al. | 280/43.23 |

Primary Examiner—David M. Mitchell
Attorney, Agent, or Firm—Kinney & Lange

[57] ABSTRACT

A lift mechanism for implements such as tool bar frames used with field cultivators and chisel plows includes means for eliminating torsional loading on the axle support and react vehicle loads through a three bar mechanism back to the frame. All structural members carrying loads are therefore stressed in compression or tension.

9 Claims, 2 Drawing Figures

INTEGRAL CYLINDER LIFT MECHANISM

BACKGROUND OF THE INVENTION

1. Field of the Invention

The present invention relates to a lift mechanism for use with various agricultural and other implements requiring height adjustment.

2. Description of the Prior Art

In the prior art various lift cylinder mechanisms have been advanced for raising large implements, particularly tool bar frame implements such as field cultivators and chisel plows. For example, U.S. Pat. No. 4,194,573 shows an agricultural subsoil implement having individual wheel assemblies which are controlled by hydraulic cylinders for raising and lowering the support wheels relative to the frame and thus raising and lowering the frame relative to the ground. The cylinders are directly supported back to the frame, and this requires substantial complexity in the design in order to maintain the correct placement of the cylinder mount location. Further, adjustments for adjusting the cylinder position to compensate for wear is quite difficult. This is particularly true where a stop member is provided on the cylinder so that when the cylinder is retracted it returns to a fixed length.

U.S. Pat. No. 4,117,893 shows an agricultural tool bar with individual wheel assemblies that are adjusted through the extension and retraction of hydraulic cylinders for depth control. The cylinders are also mounted directly between the frame and the wheel assemblies and have the same problems as those shown in U.S. Pat. No. 4,194,573.

U.S. Pat. No. 4,106,568 shows a chisel plow with a rock shaft depth control of the conventional type. The device of the present invention is designed specifically to correct the torsion loading present in the axle tubes shown in U.S. Pat. No. 4,106,568.

Threaded adjustments are known for adjusting depth controls. For example, in U.S. Pat. No. 2,655,851 there is a lift cylinder supported on an overhead frame and which acts directly to pivot a support member for the wheels and has a threaded piston rod for adjustment purposes. U.S. Pat. No. 4,117,893 also shows a cylinder mounted on an overhead frame and operable for raising and lowering support wheels.

Threaded stops are also known. For example, U.S. Pat. No. 3,700,043 shows a threaded stop for stopping movement of the piston rod in a desired location.

Typical additional patents which illustrate the state of the art and which were uncovered in the course of a preliminary search include U.S. Pat. Nos. 1,844,124; 3,090,446; 3,648,780; 3,172,218; and 4,077,477.

SUMMARY OF THE INVENTION

The present invention relates to a lift mechanism using a double acting hydraulic cylinder in the lift mechanism which acts directly on a pivoting axle leg that supports the wheels of an implement. The axle leg is fixed to a pivoting axle tube which is pivotally supported on the implement frame. The cylinder is connected to a mast that is rotatably or pivotally mounted on the axle tube. An adjustable reaction link is used for reacting load from the mast (as it tends to rotate) back to the implement frame. All supporting components are stressed in either tension or compression (except for small torsion loads caused by frictional forces in the rotational mountings of the axle tube) thereby simplifying the construction of the lift framework itself and additionally permitting reduction in the size and weight of the axle tube.

The forces are resolved into the tension and compression components by use of the described three bar linkage, which eliminates substantial torsion loading in any parts caused by the load on the wheels supporting the implement.

A simple length adjustment link is used to permit compensation for wear giving a strong, economical and very reliable lift mechanism.

DESCRIPTION OF THE PREFERRED EMBODIMENT

Figure 1:
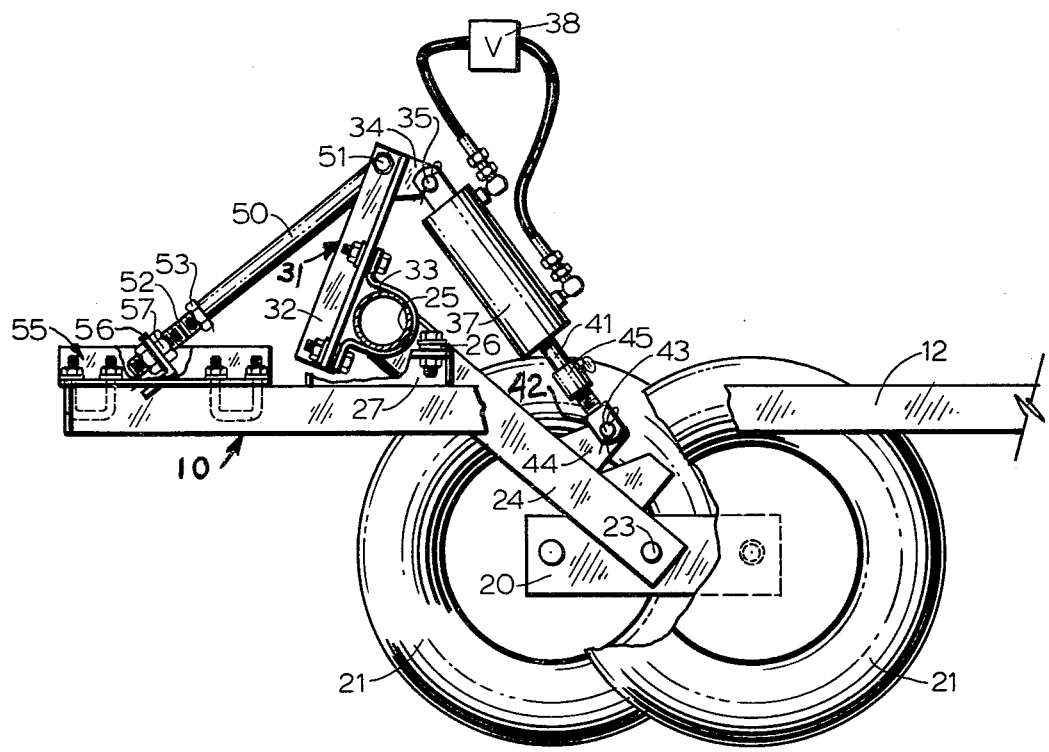
FIG. 1 is a fragmentary side elevational view of a typical tool bar implement frame having support wheels operated by an integral lift cylinder mechanism made according to the present invention.
Figure 2:
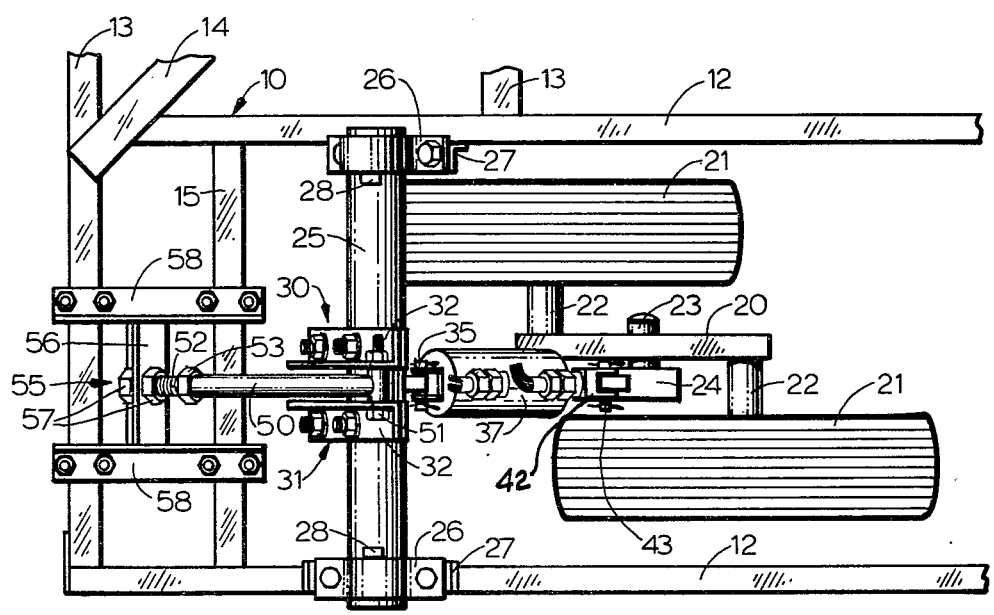
FIG. 2 is a top plan view of the device of FIG. 1.

An implement frame indicated generally at 10 is shown only schematically in the present drawings, because it can be any desired type of frame such as those discussed in connection with the prior art identified above, or tool bar frames used for field cultivators and chisel plows and air seeders made by Wil-Rich, Inc., of Wahpeton, N. Dak., the assignee of the present application. The frame 10 includes fore and aft extending frame members 12, 12 which are spaced transversely apart and fixed in place with transverse frame members 13. Suitable cross braces 14 can be used on the frame 10, if desired. Cross members 15 are used adjacent the wheel mounting regions for additional strength.

The lateral or transverse frame members 13 are used for mounting suitable earth working tools or other devices (not shown) such as field cultivator shank assemblies or chisel plow shank assemblies.

The height of the frame 10 relative to the ground level is controllable with the device of the present invention by controlling the relative positions of a plurality of walking beam assemblies 20, one of which is shown in the drawings. The walking beam assembly 20 carries spindles 22, 22 on which the wheels 21, 21 are mounted. The walking beam assembly 20 in turn is pivotally mounted on a support shaft 23 that is mounted at the end of an axle leg 24. The upper end of the axle leg 24 is welded to an axle tube 25.

The axle tube 25 in turn is rotatably mounted in a pair of bearing supports 26, 26 which in turn are supported on axle tube supports 27, 27. Each of the axle tubes supports 27 is supported from a separate one of the force and aft frame members 12, and the axle tube 25 is prevented from sliding axially relative to the bearing supports 26 by suitable stop members 28 which are welded to the tube but yet will permit the tube to rotate during adjustment of the axle leg. The vertical position of the wheels 21, 21 relative to the frame is adjusted by controlling the pivoting of the axle tube.

In many previous devices, the adjustment of height of the frame relative to the wheels has been accomplished by having the axle tube 25 act as a torsion shaft which is operated by a cylinder that is offset from the center line of the axle leg 24. In previous lift arrangements substantial torsion loads were introduced into the axle tube, requiring heavier tubes with greater wall thicknesses and larger diameters than needed with the present lift.

The device of the present invention eliminates torsion loads in the axle tube by providing a three bar linkage illustrated generally at 30 to support the loads on the axle leg from the wheels 21 and react the loads back to the frame.

The three bar linkage includes a mast assembly 31 that comprises a pair of spaced members 32 which are rotatably mounted on the axle tube 25 through the use of a pair of mast bearing caps 33, one of which is suitably attached to each of the members 32. Mast assembly 31 further includes a cylinder support ear 34 that is mounted between the members 32, 32 at the upper ends thereof. Ear 34 is provided with an aperture that receives a mounting pin 35 for pivotally mounting the base end of a double acting hydraulic cylinder assembly 37 to support ear 34. The cylinder assembly 37 is operated through a suitable valve 38 to extend and retract a cylinder rod 41. Rod 41 has a clevis or rod end 42 pivotally mounted by a pin 43 to an ear 44 that is fixed to the axle leg 24.

An adjustable mechanical stop member 45 is mounted on the cylinder rod 41 so that the retracted position of the rod can be mechanically determined. The stop 45 will engage the end of the cylinder to provide a precise mechanical location for the lowest position of the frame. The stop 45 is adjustable to permit a fixed position to be achieved when retracting the cylinder assembly 37.

The force or load from the weight supported by wheels 21 that is reacted by the lift cylinder assembly 37 to the mast assembly is transmitted back to the frame 10 through a force link 50. The mast, as previously explained, is free to rotate on the tube 25.

The force link 50 comprises a tube that is pivotally mounted at one end as at 51 between the mast members 32, 32 of the mast assembly. A threaded adjustment rod 52 is threaded through a nut 53 which is welded to the end of the tube. The rod 52 can be threaded to change the length of the force link as desired. The lower end of the force link, comprising the threaded rod 52, is mounted through an anchor assembly indicated generally at 55 that includes a cross member 56 that has an opening through which the threaded rod 52 is passed. Lock nuts 57 are used for clamping the lower end of the rod 52 and thus the lower end of the force link securely to the anchor assembly. In addition to the cross member 56, the anchor assembly has fore and aft extending members 58 that are attached to lateral frame members 13 and 15 with U bolts, as shown in FIG. 1, so that the force link is securely anchored back to the implement frame.

As mentioned, the force exerted on the axle leg 24 by the lift cylinder 37 is carried back to the mast assembly 31 which is free to rotate on the axle tube 25, and the load is reacted through the force link 50 back to the frame. This puts the cylinder assembly 37 in compression and the force link 50 in compression while the mast assembly carries some tension. The axle tube 25 is not subjected to torsion loads during the raising and lowering operations. Additionally, the length of force link 50 can be adjusted to compensate for wear and the stop 45 can be utilized for letting the lift cylinder return to a set position when it is retracted to lower the frame relative to the ground.

Thus, a simple framework is utilized by having a mast that pivots relative to the movable or pivoting axle support, which is directly centered on the axle leg. The linkage mechanism carrying the implement load forces are subjected to tension and compression load rather than torsion loads.

What is claimed is:

1. In an implement lift mechanism comprising a vehicle frame, support wheel means for said frame, an axle leg mounting said support wheel means at a first end thereof, said axle leg having a second end thereof rotatably mounted relative to the frame, the improvement comprising:
   a mast assembly rotatably mounted on the frame about the same axis as the axle leg and extending upwardly therefrom;
   first link means connected between said mast assembly and said frame, said first link means being adjustable to permit adjusting the position of the mast assembly; and
   second link means extending between said mast assembly and said axle leg, said second said link means comprising an extendable and retractable hydraulic cylinder to cause the axle leg to rotate about its axis of mounting, the second link means carrying the load from the axle leg to the mast and the first link means reacting the load from the rotatably mounted mast assembly to the frame.

2. The combination as specified in claim 1 wherein said first link means is adjustable in length to permit fixing the position of said mast assembly about the axis of rotation thereof relative to the frame.

3. The combination as specified in claim 2 and an axle tube rotatably mounted on said frame about a generally horizontal axis comprising the pivot axis, said axle leg being fixed to said axle tube, and mast cap means attached to said mast assembly and forming bearings to rotatably mount said mast assembly on said axle tube.

4. The combination as specified in claim 1 wherein said first and second link means have central longitudinal axes that lie generally parallel to and in substantially the same plane as the longitudinal central axis of said axle leg.

5. The combination as specified in claim 4 wherein said wheel means comprises a walking beam assembly pivotally mounted to a lower end of said axle leg.

6. The combination as specified in claim 1 wherein said hydraulic cylinder has an extendable and retractable rod, and an adjustable stop means on said rod to mechanically position a stopped retracted position of said rod.

7. The combination as specified in claim 3 wherein said frame has a forward side and a trailing side, and said adjustable first link means is mounted forwardly of the axle tube, and said extendable and retractable link means comprising the second link means and being mounted above said axle leg to the rear of said mast assembly.

8. In an implement comprising a vehicle frame, support wheel means for said frame, an axle leg mounting said support wheel means at a first end thereof, said axle leg having a second end thereof rotatably mounted relative to the frame about a generally horizontal axis, the improvement comprising:
   a mast rotatably mounted on the frame about the same axis as the axle leg and extending upwardly therefrom;
   first link means connected between said mast and said frame, said first link means being selectively adjustable in length to adjust the angular position of the mast about said axis; and an extendable and retractable hydraulic cylinder connected between said mast and said axle leg to selectively cause the axle leg to rotate about its axis of mounting, the first link means reacting the load on the mast from the hydraulic cylinder tending to rotate the mast about said axis back to the frame as a compression load on first link means.

9. A lift mechanism for use with an agricultural implement having a vehicle frame, support wheel means for said frame, an axle tube rotatably mounted on the frame about a generally horizontal axis extending transversely to the direction of movement of the vehicle frame, an axle leg mounting said support wheel means at a first end thereof, and said axle leg having a second end thereof fixed to the axle tube for pivotal movement about the tube axis relative to the vehicle frame, the lift mechanism comprising:

a mast assembly rotatably mounted on the axle tube and extending upwardly therefrom substantially in transverse alignment with the axle leg;

first link means having an adjustable length coupled between said mast assembly and said frame for adjusting the position of said mast relative to the frame; and second link means extending between said mast assembly and said axle leg, said second link means being extendable and retractable under force to cause the axle leg and axle tube to rotate about the axis of mounting, the first link means carrying the load from the mast to the frame, one of the link means extending forwardly from the mast and the other link means extending rearwardly from the mast with respect to the normal direction of travel of the frame.

* * * * *